Patented May 16, 1944

2,349,060

UNITED STATES PATENT OFFICE 2,349,060

PREPARATION OF 4-PYRIDINE SULPHONAMIDES AND RELATED COMPOUNDS

Adolph E. Tiesler, Pearl River, N. Y., assignor to Lederle Laboratories, Inc., New York, N. Y., a corporation of Delaware No Drawing. Application December 12, 1940, Serial No. 369,803

4 Claims. (Cl. 260—290)

This invention relates to 4-sulphonamides of pyridine and to a process for their manufacture.

The object of this invention is to produce a series of new compounds which have unusual properties of considerable commercial importance. Many of these compounds are relatively non-toxic; and since they are somewhat closely related to 4-aminobenzene sulphonamides, they may be useful as therapeutic agents in the treatment of infectious diseases especially those of the streptococci type. Many of the compounds may also be useful as assistants in the dyeing and finishing of textiles. For example, some of the compounds have appreciable wetting-out power when added to aqueous solutions used to treat textiles. The compounds may also be used to increase wetting powers of others substances. For example, a mixture of 4-pyridine sulphonamide and Turkey red oil is a valuable assistant for addition to dye baths and is superior to either of these substances alone. They may likewise be used in dye baths with mixtures of compounds such as alkyl naphthalene sulphonic acids and sulphonated fatty alcohols. The sulphonamides of the present invention are also useful as intermediates in the preparation of other substances, particularly azo dyestuffs and pharmaceuticals.

The pyridine sulphonamides of the present invention may be represented by the following general formula:

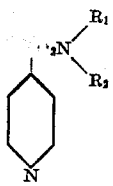

in which $R_1$ and $R_2$ may be hydrogen, alkyl, aryl, aralkyl, a heterocyclic, as well as acyl radicals and salts of such compounds.

While the compounds of the present invention are not limited to any particular method for their preparation, we have found that they can very conveniently be prepared by the following process, which process is a preferred method of producing the compounds in accordance with the invention. In producing the pyridine sulphonamides, 4-pyridine sulphonic acid is dissolved in absolute ethyl alcohol and dry hydrochloric gas is passed through the solution for about one hour and the solution is then refluxed on a steam bath for about 20 hours. This results in the production of the ethyl ester of 4-pyridine sulphonic acid, the hydrochloric gas acting as catalyst in the reaction which takes place is illustrated by the following equation:

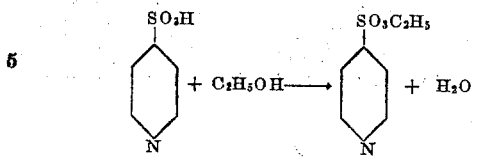

The ethyl ester of the 4-pyridine sulphonic acid obtained in the first step is suspended in a relatively large volume of dry ether and ammonia gas is passed through the ether suspension for 2 or 3 hours. The second reaction results in the production of the amide which is insoluble in ether and readily separates out. The reaction that takes place in the second step is illustrated by the following equation:

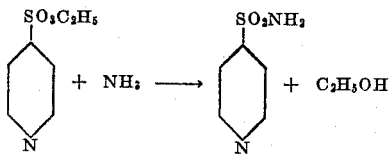

The above equation represents the reaction which takes place when ammonia gas is used to produce 4-pyridine sulphonamide itself, e. g., the compounds represented by the general formula in which $R_1$ and $R_2$ are both hydrogen. When at least one of the radicals $R_1$ or $R_2$ is to be a radical other than hydrogen these compounds may be produced by substituting a primary amine for the ammonia gas in the above process. Among the amines that may be used are compounds such as ethyl amine, butyl amine, allyl amine, aniline, and benzyl amine. Compounds in which both $R_1$ and $R_2$ are radicals other than hydrogen may be produced by substituting a secondary amine for ammonia gas in the process as outlined above. Suitable secondary amines include compounds such as diethyl amine, dibutyl amine, dibenzyl amine and the like.

The invention is further illustrated in connection with the following specific example which represents a preferred method for manufacturing representative compounds in accordance with the invention, which, however, is not restricted to the specific details given.

EXAMPLE

*Preparation of 4-pyridine sulphonamide*

20 parts of 4-pyridine sulphonic acid is dissolved in 200 parts of absolute ethyl alcohol and dry hydrochloric acid gas is passed through the solution for about one hour. The solution is then refluxed on a steam bath for about 20 hours. The alcohol is evaporated off in vacuo and the resulting syrup is dissolved in absolute methyl alcohol. An excess of acetone is added to this solution whereupon the ester of the 4-pyridine sulphonic acid, being insoluble in the acetone, separates out as a syrupy mass at the bottom of the container. The syrupy mass is separated from the actone mixture and suspended in a relatively large amount of dry ether. Ammonia gas is passed through the ether suspension for 2 or 3 hours. The 4-pyridine sulphonamide formed is insoluble in the ether and separates out in the form of a precipitate. The product thus obtained may be purified by extraction with absolute ethyl alcohol, refluxed with decolorizing carbon, filtered, and reprepicitated from the filtrate.

In the above example the absolute ethyl alcohol employed in the preparation of the ester of the 4-pyridine sulphonic acid may be replaced in whole or part by any other alcohol which will react to form the corresponding ester. Suitable alcohols are preferably those of low molecular weight such as methyl, propyl, butyl, amyl, and the like. The ester of the 4-pyridine sulphonic acid may be suspended in liquids other than ether or organic liquids may be used which are solvents for the ester as well as for the amide which is formed by the reaction. As pointed out heretofore in this specification, the ammonia gas employed in the above examples may be replaced by other amines or amides.

What I claim is:

1. A process for producing 4-pyridine sulphonamides which comprises reacting an ester of 4-pyridine sulphonic acid with a substance selected from the group consisting of ammonia and amines.

2. A process for producing 4-pyridine sulphonamides which comprises reacting an ester of 4-pyridine sulphonic acid with an amine.

3. A process for producing 4-pyridine sulphonamide which comprises reacting 4-pyridine sulphonic acid ethyl ester with ammonia.

4. A process for producing 4-pyridine sulphonamide which comprises reacting 4-pyridine sulphonic acid with ethyl in the presence of HCl alcohol to produce an ester and reacting the ester with ammonia.

ADOLPH E. TIESLER.

CERTIFICATE OF CORRECTION.

Patent No. 2,349,060.

May 16, 1944.

ADOLPH E. TIESLER.

It is hereby certified that error appears in the printed specification of the above numbered patent requiring correction as follows; Page 1, second column, line 1, for the syllable and word "tion which" read --tion. The reaction which--; page 2, second column, line 23, claim 4, strike out "alcohol" and insert the same after "ethyl" in line 22, same claim; and that the said Letters Patent should be read with this correction therein that the same may conform to the record of the case in the Patent Office.

Signed and sealed this 15th day of August, A. D. 1944.

Leslie Frazer

(Seal)

Acting Commissioner of Patents.